May 29, 1923.
G. H. SAUNDERS
1,457,004
EDIBLE CEREAL PRODUCT AND PROCESS OF MAKING
Filed Aug. 26, 1921
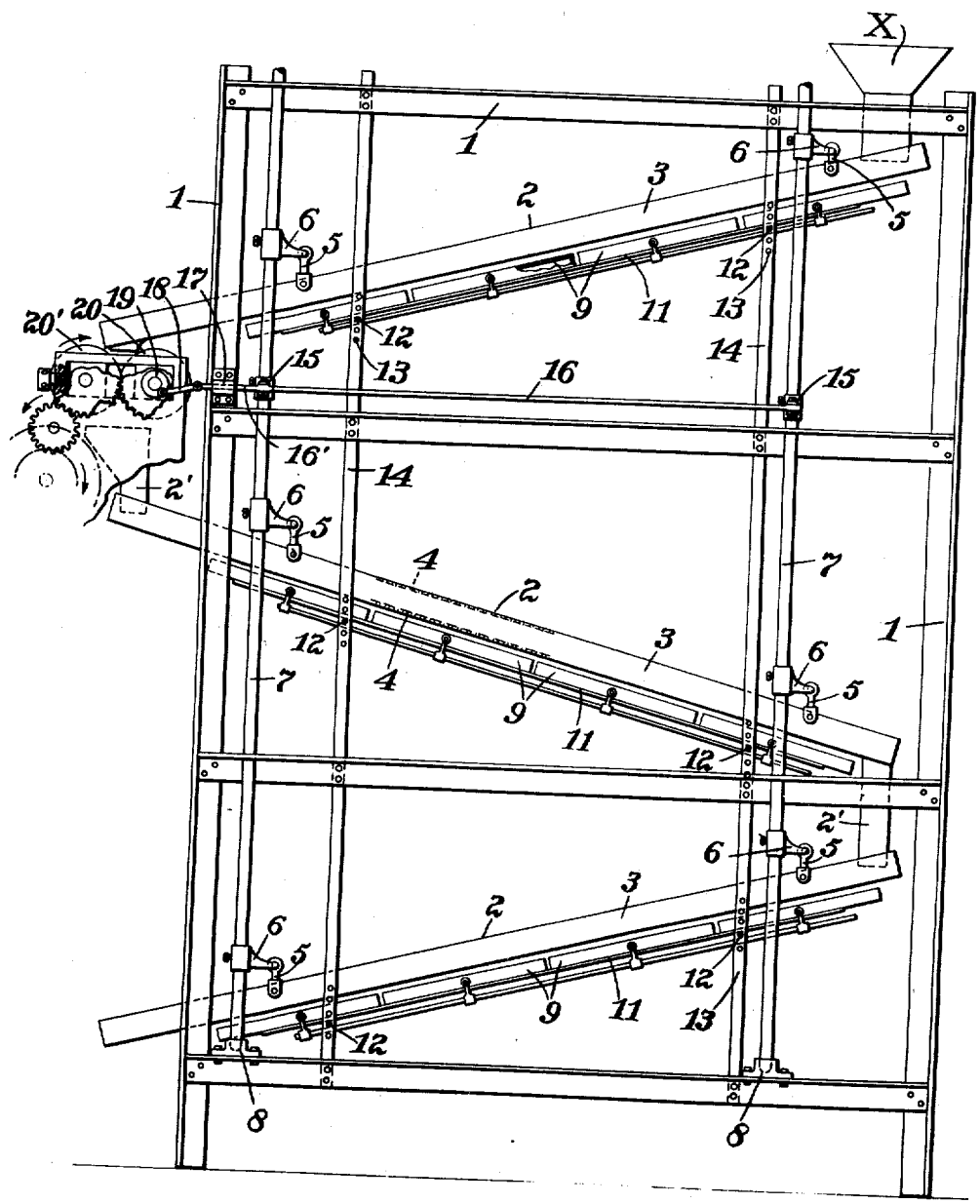
Inventor:
George H. Saunders,
by Spear, Middleton, Donaldson & Hall
Attys.

Patented May 29, 1923.

1,457,004

UNITED STATES PATENT OFFICE.

GEORGE H. SAUNDERS, OF AKRON, OHIO, ASSIGNOR OF ONE-HALF TO ADDISON T. SAUNDERS, OF CHICOPEE, MASSACHUSETTS.

EDIBLE CEREAL PRODUCT AND PROCESS OF MAKING.

Application filed August 26, 1921. Serial No. 495,467.

*To all whom it may concern:*

Be it known that I, GEORGE H. SAUNDERS, a citizen of the United States, and resident of Akron, in the county of Summit, in the State of Ohio, have invented certain new and useful Improvements in Edible Cereal Products and Processes of Making, of which the following is a specification.

My present invention relates to the cereal product, disclosed in application for Letters Patent of the United States filed by me April 16th, 1920, Serial No. 374,458, and concerns certain additional features involved in the method of treatment, and certain new characteristics of the product resulting from these additional features of treatment.

In carrying out the method set forth in the application referred to, the cereal grain is soaked in water and thereafter subjected to high heat to cause quick conversion of the starch before a drying out action of the interior of the grain can take place, and to cause dry parching of the surface of the grain.

In my present improvement, after the grain has been soaked in fresh water, as referred to in my former application, I subject it (1) to a period of soaking in water containing salt, and (2) I mechanically break into fragments or small pieces the parched shell or skin, this being done at a certain point in the treatment of the grain with heat, but without separating or removing the fragments of the parched shell from the grain.

I find that for some uses I improve the flavor of the product, and that I also avoid the danger of the grain souring by changes during the soaking, by having the last water slightly salt—approximately one pound of dairy salt to fifty gallons of water—and allowing the grain to stand in this solution from six to twelve hours. This time is considered as a part of the total time given for soaking.

The actual time required depends upon the size of the grain. To ascertain when the proper condition is obtained I remove a few grains from the solution, rinse the surface, and if, on chewing, the body or center of the grain has a slight salt taste, it is right. (A chemical test may be substituted for tasting, to determine whether the salt has reached the center, applying it to sectioned grains.)

Care must be exercised not to use too strong a solution, as the finished product is more salt to the taste than the water-saturated grain.

I also find that in some grain, when treated by the process above referred to, the parched surface, shell or epidermis is somewhat too resistant to mastication—is hard to chew.

I have discovered that I can overcome this by a step during the processing, breaking up this parched shell by mechanical means, and without separating it from the body of the grain.

The accompanying drawing represents an apparatus by which my present invention may be practiced and the new product obtained.

The apparatus includes a plurality of inclined screens 2, each composed of shallow sides of metal strips 3 and top and bottom walls of perforated metal or wire screen material 4, 4, between which the material passes. Any suitable number of screens may be employed. For economy of space they incline in reverse direction, and the grains delivered from the lower end of one screen are received by the upper end of the next screen below. Suitable chutes 2' are interposed to direct the material from one screen section to the other.

The screens are supported (near each of the four corners) by hangers 5 attached to arms 6 adjustably affixed to vertical rock-shafts 7 resting (or operating) in suitable (lubricated) bearings 8.

Below the screens are mounted gas plates, or heaters, 9. These are supplied with gas through piping from any suitable source.

The heaters, or burners, have their upper walls perforated so that a large number of gas jets will be produced to heat the grains as they pass down along the screens.

These heaters rest upon supporting bars 11 (extending under the major part of their length) and these bars rest in turn upon rods 12, at right angles to them, extending across beneath them and removably located in perforations 13 of the vertical hanger strips 14 of which there is one adjacent each of the four corners of the frame 1.

To facilitate the traverse of the grains down along the screens' surfaces during the processing, the screens may be agitated by rocking the shafts 7 about their axes.

This may be done by any suitable means such as shown—or as follows:

Arms 15 are affixed to two of the rock-shafts 7, at right angles to the arms 6, as shown. They are connected by the rod 16, an extension of which, 16' operates longitudinally in the bearing 17. The extension 16' is connected with one end of the crank rod 18, the other end of which is operatively attached by a suitable pin to an expansion 19 of an extension of the shaft of the roll 20, and eccentrically of said shaft.

When the rolls are rotated, as is the case when the grain is passing through the device, the rocking of the shafts results.

The pair of rolls 20, 20' is designed to receive between them the cereal grains as they pass from one of the screens to the next during the processing (as later described). They may be driven by power from any suitable source, and I have indicated one of the gears of this driving means. The cooking results as in my previous application from the application of the high heat to the grains after they have been soaked and while their interior portions are still wet. The high heat converts the starch, slightly expands the grains, and parches the exterior, leaving the natural surface in a dry parched condition. In some cases this parched exterior is too resistant for mastication and by passing the grains through the rotating rolls 20—20' this parched skin or covering is broken into small fragments, but these are not separated from the cooked or doughy interior, but on the contrary remain adhering thereto. This doughy interior portion of the grain provides a yielding or sponge-like backing for the hard exterior shell, so that the fragments resulting from its fracture, by passing between the rolls, will not fly off as would be the case if the interior portion of the grain were hard and resistant, in which event a crushing action, such as is given by the rolls, would be liable to crack not only the hard shell but also the inner portion of the grain itself, resulting in dividing the grain up into fragments. Such is not the case with my method and product as the spongy interior, after the grain is passed through the rolls, remains intact though its form has been slightly changed, but not crushed flat.

The soaking of the grain first in fresh water and then in salt water can be accomplished in one vat, by drawing off the fresh water and introducing the salt solution, or separate vats may be used, one for the fresh water soak and the other for the salt water soak.

During the soaking of the grain the water may be changed as many times as may be desired, and after being subjected to the salt bath the grain may be rinsed in fresh water, and after thorough draining it is ready to be introduced upon the first screen and subjected to the intense heat existing there. The grain while being soaked is, preferably, well stirred.

The soaked grain is introduced at the point X through a suitable hopper and it then passes down the first or upper screen, through the rolls, and thence down from screen to screen to the discharge point.

While the temperatures employed at different stages of the operation, and the duration of time in which the grains are subjected to treatment by these temperatures, may vary according to the kind of grain being treated, and the size and condition of the grain, I would state that at the upper screen the temperature may be approximately 1100° to 1300° F. The period of time that the grains are subjected to this heat is about, say forty seconds, this being the time necessary for the grain to traverse the first screen from its upper to its lower end and before passing through the rolls 20—20'. This heat will convert the starchy interior, slightly expand it, and it will also dry the exterior of the grain, if this has not been previously dried, and then parch it, so that when the grain reaches the rolls its exterior will be dry parched and its interior will be steamed cooked.

For larger grains, the movement would need to be slower than for small sizes, and thus the duration of treatment would be longer. This duration is regulated by inclining the screens more or less.

The temperature for the screens over which the grain passes after the rolling may be approximately 400° F. for the first one, and 350° F. for the second and succeeding screen or screens, and the pitch of these screens should be such as to make the period before discharge about three times as great as that prior to the rolling.

During the continuation of the cooking, after rolling, the grain re-expands or resumes approximately the form it had before rolling. The rolls do not produce a flat wafer-like product, and are not designed to do so.

The space between the rolls 20—20' is therefore so regulated that, while on the one hand the grains are pressed to such an extent as to break up the parched shell and their general shape has been altered, this alteration is not carried to such a degree as will materially affect the general aspect of the grain, such as would be the case if the grain were changed from a substantially globular form to a disc or waferlike form, and whatever degree of change takes place is subsequently modified by the partial restoration of the grain to its original shape by the heating after passing between the rolls, which results in re-expansion of the grains, as above mentioned. The final product is somewhat flattened in respect to the original shape of the grain, some grains more than others.

After leaving the screens the material may be made to travel through a zone of gentle heat to complete the drying of the interior.

The mechanical cracking results in severing the hard shell, but the severed portions resulting from this mechanical cracking are not widely separated as in puffed products.

The above specification and the accompanying drawing are to be considered as descriptive of an example of ways and means to carry my invention into practice and are not to be regarded as limiting the scope of my invention to the things shown and described, reliance in this respect being had upon the definitions set forth in the appended claims.

The mechanical breaking of the shell of the grain may be successfully done before any heat is applied, as well as after this shell is parched.

When the grain is treated according to the modification of the process just mentioned, i. e., passing it through the rolls before heating instead of after heating, the soaking need not be of the same duration as is the case in the process as first described. Assuming that a certain water or moisture content should exist in the grain when it is acted on by the rolls, it is obvious that if the rolling takes place after heating some of the moisture will have been driven off by the heating action and to compensate for this loss the initial soak must be greater in the case of heating before rolling as compared with rolling the soaked grain while cold. Further, when the rolling is done cold a much lower heat is adequate to do the parching and cooking because of the fact that there is less moisture to deal with.

While I do not limit myself to any fixed period of time for the soaking of the grain I may state as an example that a period of about twelve hours suffices for soaking when the grain is to be rolled before heating as against 24 hours or so when the heat is to be applied before rolling. Also, while the temperature of 1100 to 1300 degrees F. mentioned above is required for heating the longer soaked grain before rolling a temperature of about 400° to 500° F. is enough for the less soaked grain in the modified process involving rolling before cooking.

Broadly speaking therefore, the processing includes soaking and then rolling of the grain, and heating either before or after the rolling. For the best results the various steps should follow each other quickly whatever the order of these steps may be.

While I do not limit myself to the soaking in fresh water first, then in salt water and then rinsing, I prefer to use these steps because the fresh water more quickly advances the soak, and if the rinsing is not done the salt from the surface of the grains clogs the screening surface and the burners.

The apparatus may be enclosed if desired.

I claim:

1. As a new article of manufacture, an edible product consisting of a cereal grain having a dry parched surface portion, and its interior body portion steam cooked, said grain being slightly expanded and with its parched portion mechanically broken into fragments, said fragments in their approximate entirety remaining adhering to the body portion.

2. As a new article of manufacture, an edible product consisting of a cereal grain having a dry parched surface portion, and its interior body portion steam cooked, said grain being sligthly expanded and with its parched portion mechanically cracked, said grain being slightly flattened from its original form.

3. As a new article of manufacture, an edible product consisting of a rolled cereal grain having a dry parched surface portion, and its interior body portion steam cooked, said grain being slightly expanded and with its parched partion cracked.

4. The herein described process, consisting in soaking the grain in water, subjecting the same to high heat to cause expansion and quick conversion of the starch before a drying out action of the interior of the grain can take place, and also to cause dry parching of the surface of the grain, mechanically cracking the parched shell and then subjecting the grain to further heat to re-expand and dry it, substantially as described.

5. The herein described process, consisting in soaking the grain in fresh water, then in salt water, then rinsing, and then subjecting it to high heat to cause expansion and quick conversion of the salt impregnated starch, before a drying out action of the interior of the grain can take place, and also to cause dry parching of the surface of the grain.

6. The herein described process, consisting in soaking the grain in a salt solution until its interior becomes impregnated with salt, and then subjecting the same to high heat to cause quick conversion of the starch, before the drying out action of the interior can take place, and also to cause dry parching of the surface of the grain, substantially as described.

7. The herein described process consisting in soaking the grain, thereafter subjecting it to rolling to crack its exterior, and while the interior body is moist and soft so that the fragments resulting from the rolling will remain adhering to the interior body, subjecting the grain to heat to expand its moisture interior, substantially as described.

In testimony whereof, I affix my signature.

GEORGE H. SAUNDERS.

Certificate of Correction.

It is hereby certified that in Letters Patent No. 1,457,004, granted May 29, 1923, upon the application of George H. Saunders, of Akron, Ohio, for an improvement in "Edible Cereal Products and Processes of Making," errors appear in the printed specification requiring correction as follows: Page 3, line 104, claim 3, for the misspelled word "partion" read *portion;* page 4, line 11, for the word "moisture" read *moist;* and that the said Letters Patent should be read with these corrections therein that the same may conform to the record of the case in the Patent Office.

Signed and sealed this 17th day of July, A. D., 1923.

[SEAL.]
WM. A. KINNAN,
*Acting Commissioner of Patents.*